Patented May 1, 1923.

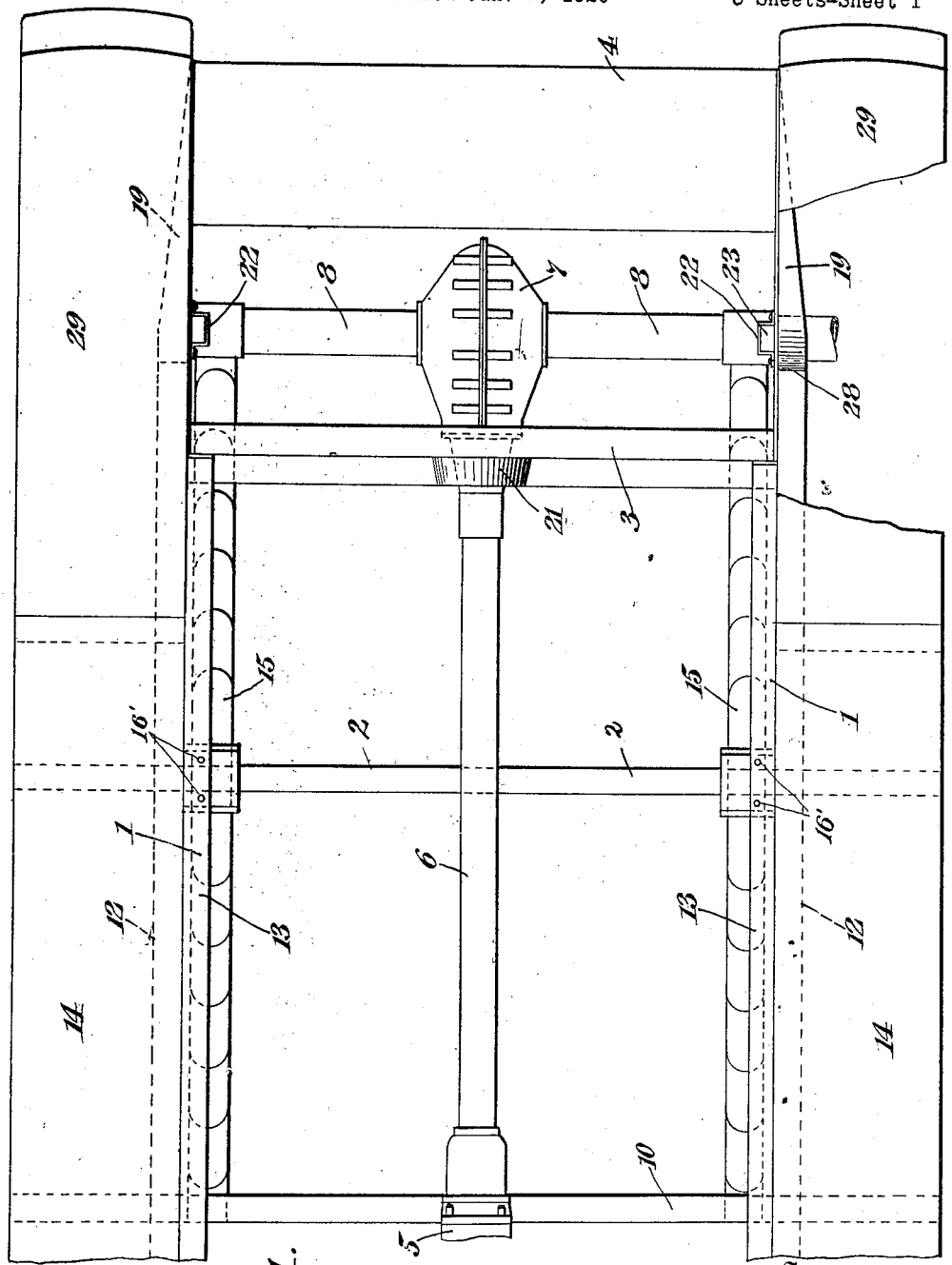

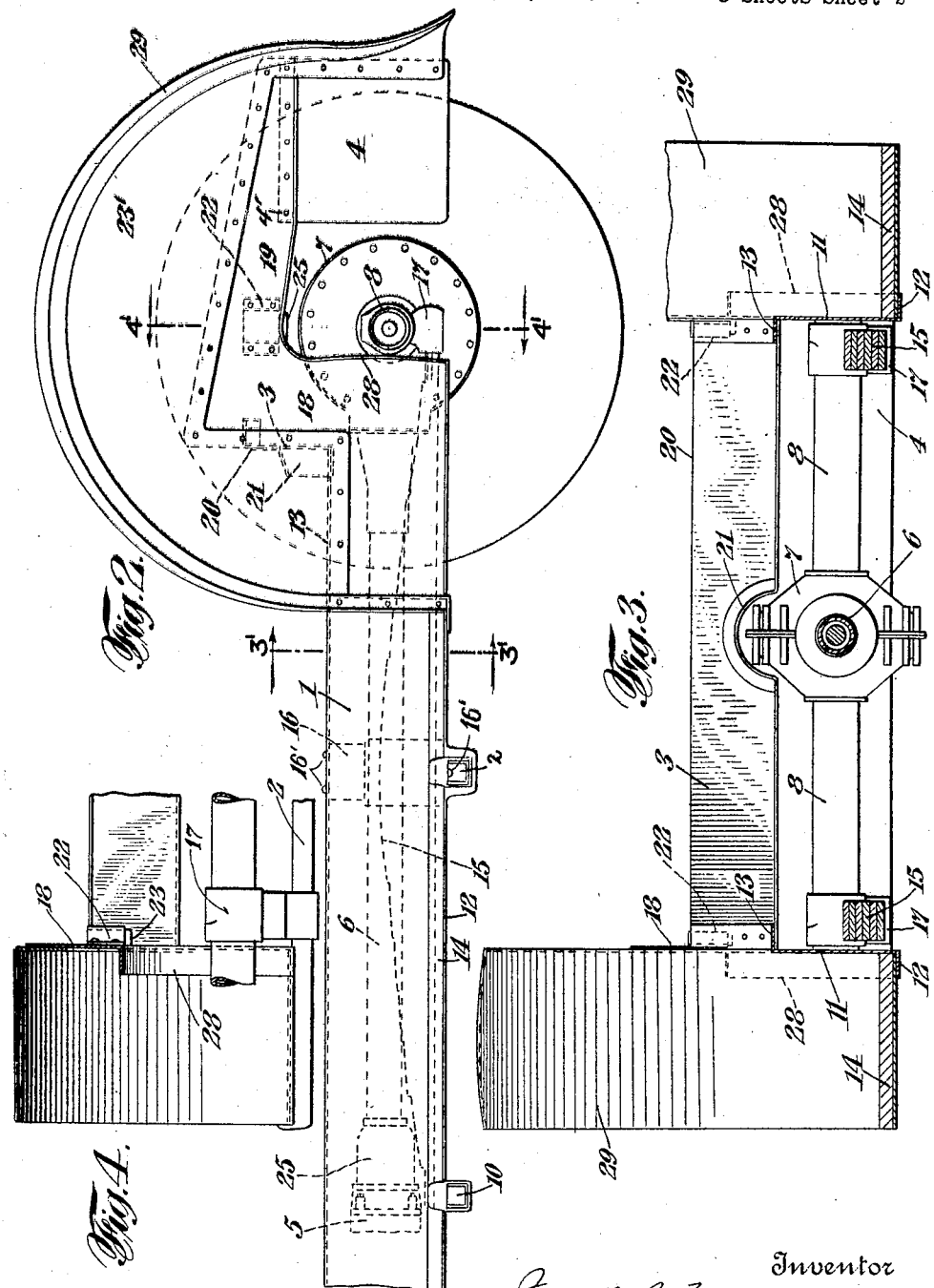

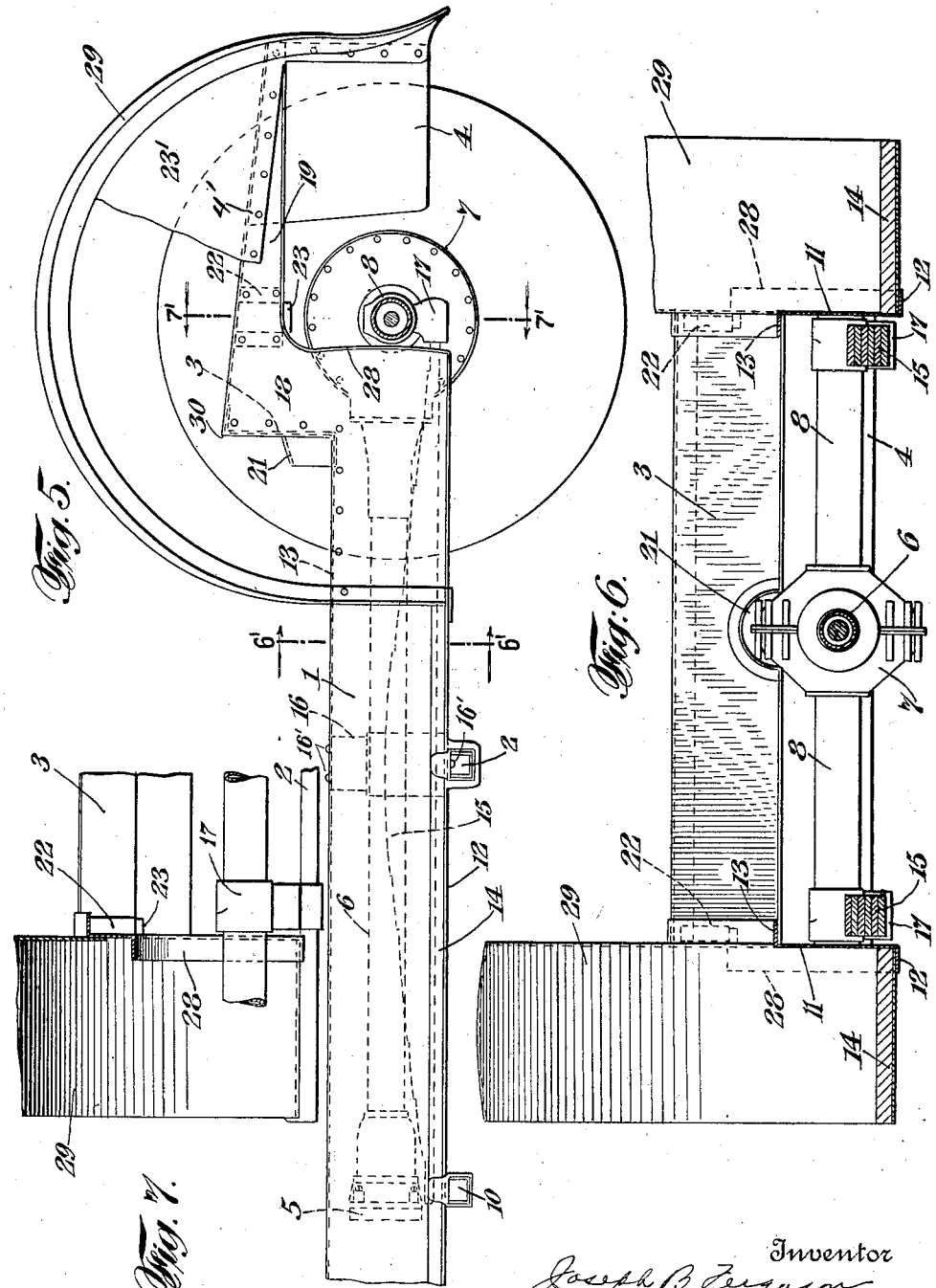

1,453,345

UNITED STATES PATENT OFFICE.

JOSEPH B. FERGUSON, OF NEWARK, NEW JERSEY.

VEHICLE.

Application filed January 9, 1920. Serial No. 350,402.

*To all whom it may concern:*

Be it known that I, JOSEPH B. FERGUSON, a subject of the King of Great Britain, residing in the city of Newark, county of Essex, and State of New Jersey, have invented certain new and useful Improvements in Vehicles, of which the following is a specification.

My invention relates to vehicles and particularly to the frame construction and to the assembly with the frame of an axle and other associated parts.

An object of my invention is to provide a frame construction and means for mounting an axle thereon, the parts being of such character and so related that the axle will be well supported against unusual shocks but free from undesirable constraint for ordinary conditions; a further object being to construct the frame and assemble the parts in such a manner that a most efficient construction for ordinary operation is obtained, and a most efficient construction for coping with unusual conditions is secured.

Another object of my invention is to provide a frame construction of maximum rigidity in which the relation of parts associated with it are most efficiently located.

In general it is an object of my invention to form individual parts of a vehicle construction so that they are individually capable of producing desirable results and so that they will lend themselves to a combination with one another so that the particular relation of parts produces further desirable results.

Other and further objects and the above objects will be more particularly pointed out in the following description taken in connection with the accompanying drawings in which Fig. 1 is a plan view of the rear construction of a vehicle embodying a form of my invention;

Fig. 2 is a partial side view partly in section of the construction shown in Fig. 1;

Fig. 3 is a cross-sectional view on the line 3'—3' of the construction shown in Fig. 1;

Fig. 4 is a partial detailed cross-sectional view of the construction shown in Fig. 4 on the line 4'—4';

Fig. 5 is a partial longitudinal view of a construction slightly different from Fig. 1, and embodying my invention;

Fig. 6 is a cross-sectional view on the line 6'—6' of the construction shown in Fig. 5; and Fig. 7 is a partial cross-sectional view on the line 7'—7' of the construction shown in Fig. 5.

In the embodiment of my invention shown in Fig. 1 for the purpose of disclosing my invention the frame includes side members 1, the particular construction of which will be described hereafter. These side members are joined by the cross members 10, 2, 3, and 4, the construction of which will be described hereafter.

Carried by the frame is the usual transmission gearing housing 5 shown in part in Figs. 1, 2 and 6, from which a torque tube 6 which encloses the propeller shaft extends to the differential gearing housing 7 from which extend the tubular portions 8 of the rear axle housing upon which the wheels (not shown) may be mounted.

The side members of the frame comprise a web portion 11, an outwardly extending lower flange 12, and an inwardly extending upper flange 13. One of the advantages of the outwardly turned lower flange is that it permits the cross members 10 and 2 to be firmly secured to it as by welding or riveting and it also provides a support extending underneath the step 14 of the vehicle, which together with the extension beneath it of the cross members 10 and 2 provides a simple and ample support without other brackets of the step 14. These cross members being square and riveted firmly to the frame provide an extremely rigid construction. The square cross member 10 provides a support for the anchorage of the front end of the springs 15. A bracket 16 surrounds the center of the springs 15 and is positioned underneath of and secured as by rivets 16' to the inwardly extending upper flange of the frame. The lower end of the bracket member 16 is also secured to the square cross member 2 as by rivets 16''. Thus it is seen that by turning the top flange inward and the bottom flange outward the springs may be placed inside of the frame and kept the maximum distance apart so that they are very close to the web of the frame, bringing the springs' pressure nearer the ends of the axle. Turning the lower flange of the side members of the frame outward provides support for the step and an anchorage for the cross members of the frame to which are attached springs and other advantages mentioned below.

The tubular members 8 carry brackets 17 which accommodate the rear ends of the springs 15.

It will now be apparent that all that part of the frame rearward of the cross member 2 where the spring bracket 16 is secured constitutes cantilever and it will be seen that the frame, the springs and the torque tube, are all approximately in the same low plane.

In order to provide clearance between the frame and the axle housings to permit the passage of the housings 8 out to the wheels and also to provide for the relative movement of the axle housings and frame when the springs bend, the side members of the frame are given an abrupt upward turn at 18 adjacent the axle housings 8, and these upwardly turned portions 18 carry a rearwardly extending portion 19. The ends of the rearwardly extending portions 19 are connected together rigidly by means of the gasoline tank 4 which forms a rear cross member of the frame the tank being fastened to the portions 19 by rivets 4'. The upper flange 13 of the side members of the frame extends upwardly along the edge of the part 18 to the point 20 in the construction shown in Figs. 2, 3 and 4. The cross member 3 is generally Z-shaped in section. Its lower flange extends under and is riveted to the horizontal portion of the flange 13 on the side member; its web extends upwardly along the upwardly extending portions of the flanges 13; and its upper flange extends rearwardly across the end 20 of the flange 13, and is turned down at its ends and secured to the web of the upwardly extending members 18 of the side frames. This cross member thus provides a rigid connection between the upwardly extending portions of the frame and it also provides a permanent heel board for the seat. The lower edge of the cross member 3 is recessed at 21 to provide clearance during the upward swing of the torque tube 6. The lower flange of the cross member 3 provides a support for longitudinally extending floor boards.

Inside of the rearward extensions 19 of the frame I provide brackets 22 which carry bumpers 23 arranged to receive the flat top portion of the spring bracket 17 during extreme flexure of the springs 15. These brackets 22 and the top flange of the cross member 3 provide supports for the body and seats while the portion 19 of the side frames extends upwardly without any flange which would interfere with the low positioning of the seat and body, for a distance which will give the necessary strength to the rearwardly extending portion 19 of the frame. This rearwardly extending portion of the frame is also given additional strength by having riveted to it the splash sheet 23' of the mudguard.

Thus in the construction shown in Figs. 1, 2, 3 and 4 the depth of the web at the point where the bumper 23 is attached is not limited as the seat does not rest upon the top flange of the extension 19, and, therefore, the rearward extension in the construction shown in Fig. 2 may be given a downward swing, lowering the position of the gasoline tank. In the construction shown in Figs. 5, 6 and 7 the downward swing of the rearward extension 19 would cause an undesirable rise in the point 30 when the depth of the frame above the axle is made sufficient.

From the construction so far described it will be apparent that the part of the axle to which the torque tube 6 extends will be constrained to move in an arc with a center at the universal joint 25.

Now if the vehicle is backed against an obstruction one or both wheels will receive a severe forward shock and if the vehicle is going forward and one wheel strikes an obstruction it will receive a rearward shock which will consequently tend to swing forward the opposite end of the rear axle, and one of the particular objects of my invention is to provide a support for the rear axle against such shocks to the axle in a plane substantially parallel with the direction of motion of the vehicle. To this end the upward extension 19 of the frame members is formed in the shape of an arc having its center approximately in a horizontal line transverse of the frame and passing substantially through the center upon which the torque tube 6 swings, and the lower flange 12 is continued along this arc-shaped edge and also along the lower edge of the rearward extension 19 of the frame members. This arc-shaped flange 28 lies adjacent to but normally out of contact with the axle housing 8 during normal operation of the vehicle. But if the vehicle is backed diagonally against an obstruction such as the curb, that end of the axle housing carrying the wheel which strikes the obstruction will be supported by being brought into contact with the flange 28 associated therewith. If the vehicle is proceeding forward and one wheel strikes a large obstruction, the axle will swing backward at the end which strikes the obstruction, and the other end of the axle will come into contact with the flange 28 associated with that other end so that the axle will be prevented from deviating excessively from the normal arcuate path to which it is constrained by the torque member 6. By turning the lower flange of the side member, and particularly the portion 28 thereof, outward this supporting effect is brought nearer to the end of the axle than would be the case if the flange turned inward in the unusual manner, and also the bumper 23 may be positioned right against the web of the side frame, thus causing it to contact with the axle nearer to its end than would be the case if the lower flange turned inward.

One of the advantages gained by using the gasoline tank as a rear-most cross member of the frame is that I am enabled to attach the arched mud-guard 29 to it without the use of any bracket and thus rigidly support the arched member down to a point close to the ground. The attachment of the lower rear end of the mud guard to the frame by means of the gasoline tank without the aid of any bracket is made possible by the extreme width of my frame which results from passing the springs inside of the frame and turning the top flange in to support the springs and the bottom flange out to avoid interference of the bottom flange with the springs.

It will be apparent from the construction described that I am enabled to secure a very low frame and at the same time permit a free upward swinging of the axle without interference by the frame, and that I am also able to support the axle against excessive shocks in both horizontal and vertical directions so as to relieve the springs and torque tube.

In the construction shown in Figs. 5, 6 and 7 the upper flange 13 of the side frame members extends upwardly along the upward extension 18 and rearwardly along the rearward extension 19 of the frame, and the flanges of the cross member 3 fit into the angles of this top flange 13. This top flange gives strength to the rearward extension 19 so that less depth is required at the point of attachment of the bumper 23 and the seat, or body, may rest right on this upper flange.

In this construction I am enabled to use the same rivets to attach the vertical sheet 23′ of the mud-guard and the gasoline tank to the rearward extension 19. The bumper 23 fits in under the inwardly extending top flange and is backed up by it. The inwardly turned flange at the top of the extension 19 extends downwardly at the rear and the gasoline tank fits right into the corner formed by the downward turn of the flange.

While I have described my invention with considerable detail I do not intend to be limited to the particular features described for the purpose of disclosing it, but intend that it shall be defined by the hereunto appended claims:

What I claim as new and desire to secure by Letters Patent is:

1. In a vehicle an axle, a frame resiliently supported from said axle, means on said frame normally out of contact with said axle for supporting said axle against shocks in a plane substantially parallel with the direction of motion of said vehicle, and rigid means connected to said frame for holding said axle and said last named means normally out of contact.

2. In a vehicle an axle, a frame, springs resiliently spacing said frame and axle, a member secured to said frame and to said axle and normally constraining said axle to motion relatively to said frame in a given path and means on said frame and brought into operation only by excessive shocks upon said axle for supporting said axle against shocks in a plane substantially parallel to the direction of motion of said vehicle.

3. In a vehicle a frame, an axle transverse of and centered with respect thereto, means for resiliently supporting said frame from said axle, a member extending from said frame to a point between the ends of said axle and normally constraining said point to substantially arcuate motion relatively to said frame, and members on said frame respectively adjacent points on said axle on opposite sides of said last named point and normally out of contact with said axle to support said axle against shocks in a plane substantially parallel to the direction of motion of said vehicle.

4. In a vehicle a frame, an axle, means normally constraining motion of one point of said axle relatively to said frame, to a definite path, and a member carried by said frame and adjacent and normally out of contact with another point of said axle to support said axle against shocks in a plane substantially parallel with the direction of motion of said vehicle.

5. In a vehicle a frame, an axle, means normally constraining motion of one point of said axle relatively to said frame to a definite path, and a member carried by said frame and adjacent another point of said axle, and normally out of contact with said axle, to support said axle against shocks in a plane substantially parallel with the direction of motion of said vehicle.

6. In a vehicle a frame, an axle, a torque member extending from said frame to said axle, a spring resiliently spacing said frame and axle, and normally inoperative means for preventing excessive deviation of said axle from the path to which it is constrained by said torque member, said means being inoperative under normal shocks upon said axle and operative under excessive shocks upon said axle.

7. In a vehicle an axle, a frame, a member extending to said axle and pivoted to said frame, and means resiliently spacing said frame and axle, said frame having a curved face adjacent and normally out of contact with said axle, the centre of curvature being substantially in the axis of said pivot.

8. In a vehicle an axle, a frame, a member extending to a point on said axle and pivoted to said frame, and means resiliently spacing said frame and axle, said frame having faces on opposite sides of said point substantially perpendicular to said member, said faces being adjacent to and normally out of contact with said axle.

9. In a vehicle, a frame, an axle, a spring supporting and spacing said frame from said axle, a member extending from said frame to said axle and normally constraining said axle to move in a given path, and means on said frame inoperative during normal operation of the vehicle for supporting said axle against excessive shocks in a plane substantially parallel with the plane of motion of said vehicle.

10. In a vehicle a frame, an axle, springs respectively engaging spaced points on said frame and spaced points on said axle, a member extending from said frame to a point on said axle between said points and constraining the point of said axle to which it extends to arcuate motion about the point on said frame from which said member extends and members carried by said frame and normally out of contact with said axle for supporting said axle against shocks substantially parallel to the plane of motion of said vehicle.

11. In a vehicle a frame comprising side members having inwardly extending upper flanges and outwardly extending lower flanges, and an axle resiliently spaced from said frame, said frame having a portion turned at an angle to the main portion thereof, said portion being positioned adjacent to and normally out of contact with said axle, whereby the outwardly turned flanges of said side members are positioned adjacent said axle near its ends.

12. In a vehicle a frame comprising side members having inwardly extending upper flanges and outwardly extending lower flanges, and a cross member secured to the lower flanges of said side members and spring brackets respectively between said cross member and said upper flanges of said side members.

13. In a vehicle a frame comprising side members having inwardly extending upper flanges and outwardly extending lower flanges and hollow square cross members secured to one flange of each side member and extending outwardly of said side members to form step brackets.

14. In a vehicle a frame comprising side members having inwardly extending upper flanges and outwardly extending lower flanges and hollow square cross members secured to one flange of each side member.

15. In a vehicle a frame comprising side members having inwardly extending upper flanges and outwardly extending lower flanges, an axle, spring brackets between said side members and abutting against the lower side of said inturned flange, cross frame-members secured to said lower flanges and engaging the lower sides of said spring brackets and springs engaging said brackets and said axle.

16. In a vehicle a frame comprising side members having inwardly extending upper flanges and outwardly extending lower flanges, and two cross-members secured to said outwardly turned flanges, an axle, and springs between said side members and respectively secured to both said cross-members and to said axle.

17. In a vehicle a frame comprising side members having inwardly extending upper flanges and outwardly extending lower flanges, and two cross-members secured to said outwardly turned flanges, an axle, a spring bracket associated with each side member and positioned between one of said cross-members and said inturned flange and springs engaged by the other of said cross members, said brackets and said axle.

18. In a vehicle a frame having side members provided with an outwardly extending flange at their lower edges and a cross member secured to said flanges, spring brackets secured to said cross members and adjacent and between said side members at the point of attachment of the cross member thereto, an axle and springs engaging said axle and brackets.

19. In a vehicle a frame comprising side members, an axle, springs between said frame and axle, said side members having an offset portion providing clearance for said axle, and a substantially vertically cross member for said frame extending between and securely attached to said offset portions at a point where said side members are offset and forming a heel-board for a seat positioned over said axle.

20. In a vehicle a frame comprising side members, an axle, springs between said frame and axle, said side members having an upwardly extending portion and a rearwardly extending portion joined to said upwardly extending portion providing clearance for said axle, the faces of said upwardly extending portions being adjacent said axle and in the path of its motion when subjected to excessive horizontal shocks.

21. In a vehicle a frame comprising side members, an axle, springs between said frame and axle, said side members having an upwardly extending portion and a rearwardly extending portion joined to said upwardly extending portion providing clearance for said axle, and a substantially vertical cross member for said frame extending between and securely attached to said upwardly extending portions of said side members.

22. In a vehicle a frame comprising side members, an axle, springs between said frame and axle, said side members having an upwardly extending portion and a rearwardly extending portion joined to said upwardly extending portion providing clearance for said axle, and a substantially vertical cross member for said frame extending between and securely attached to said upwardly extending portions of said side members and provided with a floor supporting flange.

23. In a vehicle a frame comprising side members, an axle, springs between said frame and axle, said side members having an upwardly extending portion and a rearwardly extending portion joined to said upwardly extending portion providing clearance for said axle, and a gasoline tank extending between and secured to said rearwardly extending portions.

24. In a vehicle a frame comprising side members, an axle, springs between said frame and axle, said side members having an upwardly extending portion and a rearwardly extending portion joined to said upwardly extending portion providing clearance for said axle, a gasoline tank extending between and secured to said rearwardly extending portion, and mud guards secured directly to said tank.

25. In a vehicle a frame comprising side members, an axle, springs between said frame and axle, said side members having an upwardly extending portion and a rearwardly extending portion joined to said upwardly extending portion providing clearance for said axle, a gasoline tank extending between and secured to said rearwardly extending portion and extending downwardly therefrom and mud guards secured directly to said tank.

26. In a vehicle a frame comprising side members, an axle, springs between said frame and axle, said side members having an upwardly extending portion and a rearwardly extending portion joined to said upwardly extending portion providing clearance for said axle, and bumper and body supporting brackets secured to the inner side of said side members above said axle.

27. In a vehicle a frame comprising side members, an axle, springs between said frame and axle, said side members having an upwardly extending portion and a rearwardly extending portion joined to said upwardly extending portion providing clearance for said axle, said upwardly and rearwardly extending portions having an outwardly turned flange adapted to engage said axle when it is acted upon by excessive shocks.

28. In a vehicle a frame comprising side members, an axle, springs between said frame and axle, said side members having an upwardly extending portion and a rearwardly extending portion joined to said upwardly extending portion providing clearance for said axle, said rearwardly extending portion having an outwardly turned flange on its lower edge and a bumper on its inner face over said axle.

29. In a vehicle a frame comprising side members, an axle, springs between said frame and axle, said side members having an upwardly extending portion and a rearwardly extending portion joined to said upwardly extending portion providing clearance for said axle, and a mud guard having a splash sheet secured to and reinforcing said rearwardly extending portion throughout its length.

30. In a vehicle a frame comprising side members, an axle, springs between said frame and axle, said side members having an upwardly extending portion and a rearwardly extending portion joined to said upwardly extending portion providing clearance for said axle, said rearwardly extending portion having the flange on its upper edge cut away to provide body space.

31. In a vehicle a frame comprising side members, an axle, springs between said frame and axle, said side members having an upwardly extending portion and a rearwardly extending portion joined to said upwardly extending portion providing clearance for said axle, said rearwardly extending portion having the flange on its upper edge cut away to provide body space, and a mud guard secured to said upper edge to reinforce said rearwardly extending portion.

32. In a vehicle a frame comprising side members, an axle, springs between said frame and axle, said side members having an upwardly extending portion and a rearwardly extending portion joined to said upwardly extending portion providing clearance for said axle, said rearwardly extending portion having the flange on its upper edge cut away to provide body space and brackets on the inner sides of said rearwardly extending portions for supporting a body for the vehicle.

33. In a vehicle a frame comprising side members, an axle, springs between said frame and axle, said side members having an upwardly extending portion and a rearwardly extending portion joined to said upwardly extending portion providing clearance for said axle, said rearwardly extending portion having the flange on its upper edge cut away to provide body space and brackets on the inner sides of said rearwardly extending portions for supporting bumpers and providing body support.

34. In a vehicle, an axle, a frame, a torque member pivoted to said frame and attached to said axle, said frame having faces adjacent but normally out of contact with said axle and having a center of curvature substantially in a horizontal line through the pivot of said torque member, and springs co-operating with said axle and said frame and acting with said torque member to space said frame and axle at all times during normal operation of the vehicle whereby excessive shocks in a plane substantially parallel to the direction of motion of the vehicle are transmitted by said axle to said frame through said faces.

In testimony whereof, I have signed my name to this specification.

JOSEPH B. FERGUSON.